United States Patent
Narendran et al.

(10) Patent No.: US 10,355,752 B1
(45) Date of Patent: Jul. 16, 2019

(54) PROVIDING DYNAMIC COVERAGE IN WIRELESS COMMUNICATIONS NETWORKS

(71) Applicant: Sprint Communcations Company L.P., Overland Park, KS (US)

(72) Inventors: Rajveen Narendran, Olathe, KS (US); Andrew M. Wurtenberger, Olathe, KS (US); Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/654,370

(22) Filed: Jul. 19, 2017

(51) Int. Cl.
*H04B 7/024* (2017.01)
*H04W 24/02* (2009.01)
*H04W 16/28* (2009.01)
*H04W 84/02* (2009.01)
*H04B 7/0408* (2017.01)
*H04B 7/02* (2018.01)

(52) U.S. Cl.
CPC ............ *H04B 7/024* (2013.01); *H04W 16/28* (2013.01); *H04W 24/02* (2013.01); *H04B 7/02* (2013.01); *H04B 7/0408* (2013.01); *H04W 84/02* (2013.01)

(58) Field of Classification Search
CPC ........... H01Q 1/24; H01Q 1/246; H04B 7/024
See application file for complete search history.

(56) References Cited

U.S. PATENT DOCUMENTS

| | | | | |
|---|---|---|---|---|
| 5,771,017 A | * | 6/1998 | Dean | H01Q 1/246 342/374 |
| 8,526,380 B1 | | 9/2013 | Shah et al. | |
| 2002/0147032 A1 | * | 10/2002 | Yoon | H01Q 1/246 455/562.1 |
| 2017/0078006 A1 | | 3/2017 | Liu et al. | |

FOREIGN PATENT DOCUMENTS

EP    3148145 A1    3/2017

* cited by examiner

*Primary Examiner* — Myron Wyche

(57) ABSTRACT

Systems and methods for providing configured and/or dynamically adjustable coverage in wireless communications networks is disclosed. A broadcast cell may include one or more antennas used to provide one or more sectors of coverage in the network. Each antenna may include at least one radio and at least one corresponding signal transmitting and receiving component that is in communication with the radio, allowing a signal generated by the radio to be broadcast by the signal transmitting and receiving component to form at least a portion of a sector of coverage provided by the antenna. Additionally, the signal generated by the radio may be modifiable, allowing the beam of coverage emitted by the signal transmitting and receiving component to be adjusted (e.g., in any one of an x, y, and/or z-plane) for a particular operating environment.

13 Claims, 11 Drawing Sheets

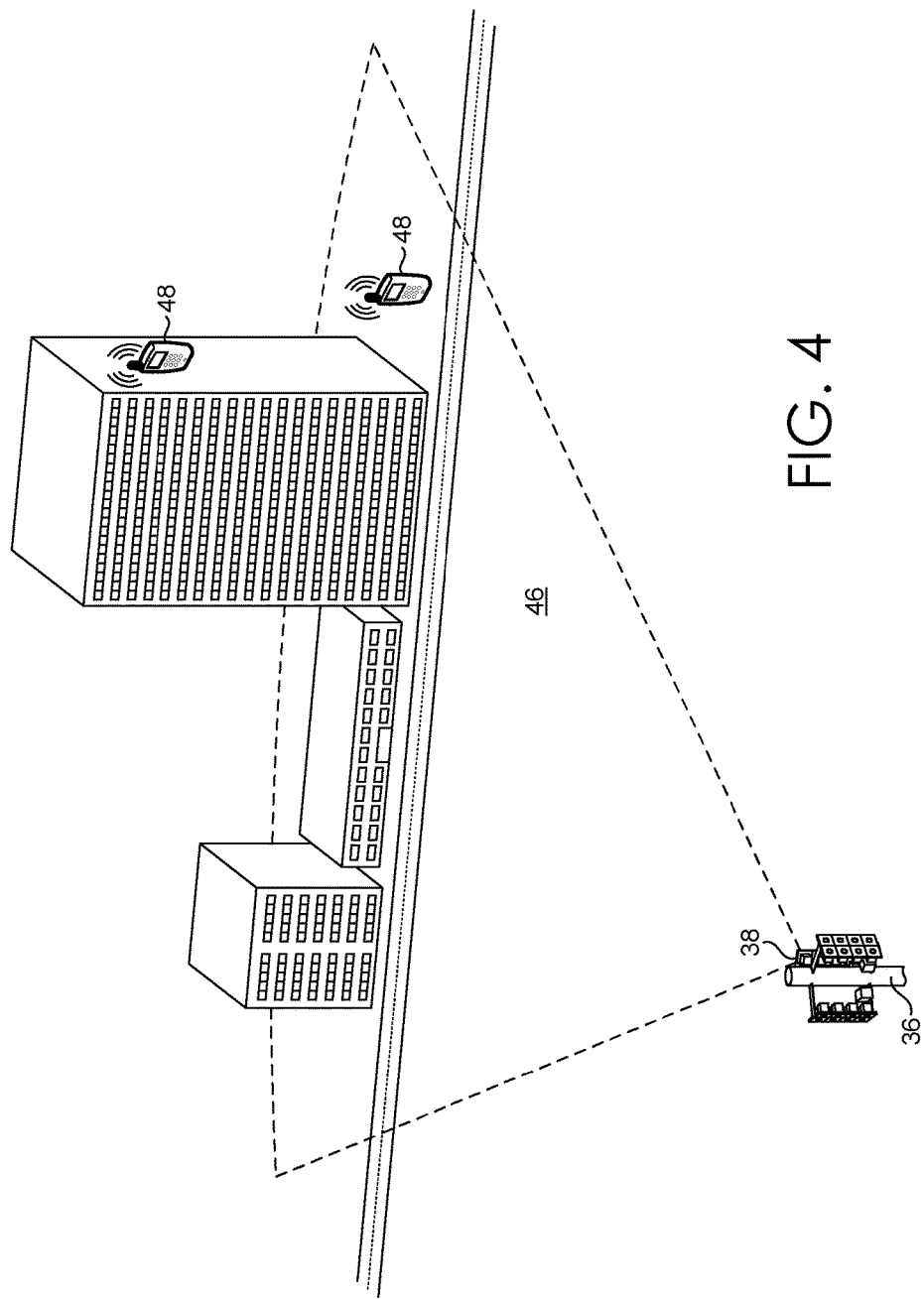

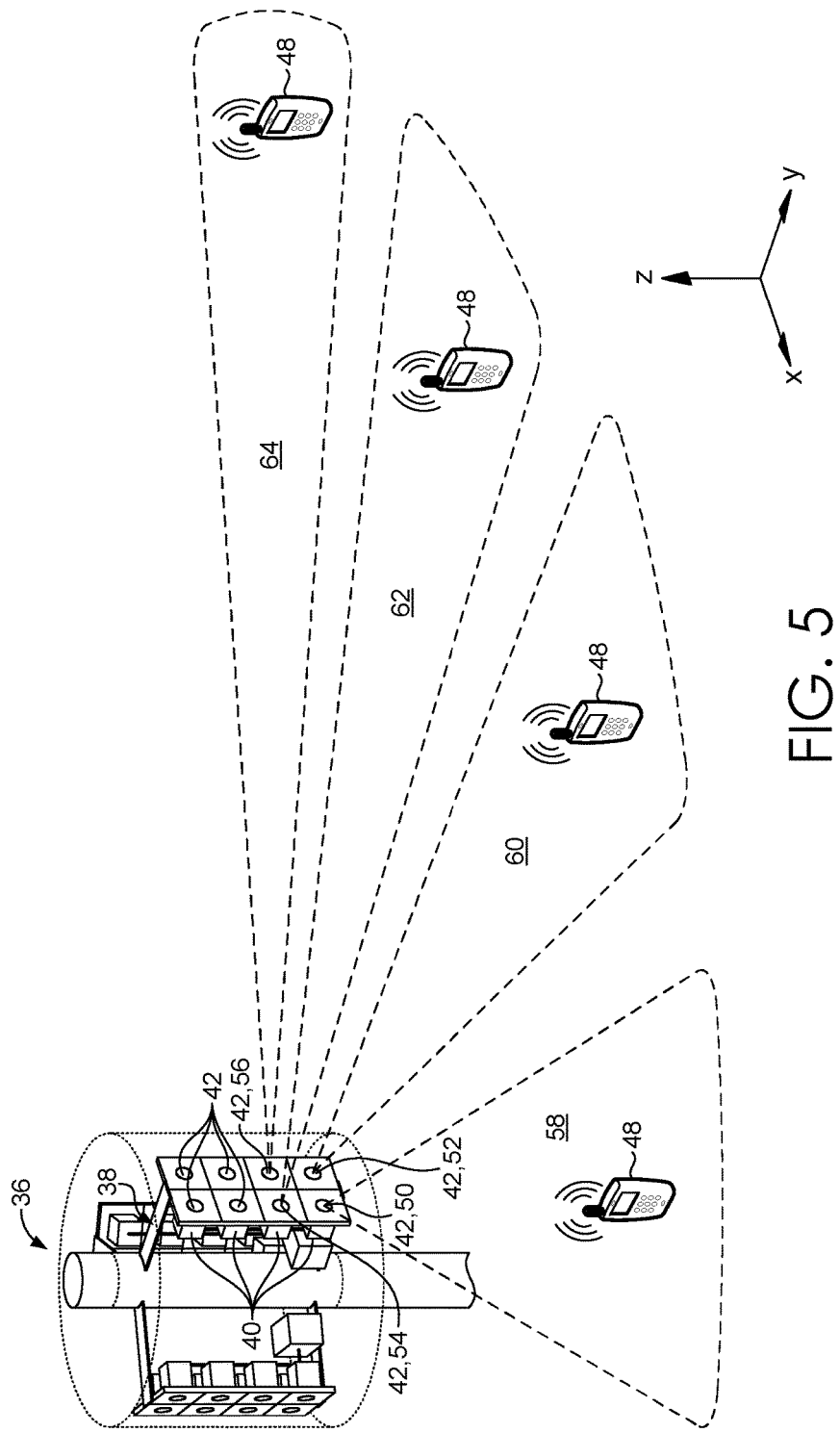

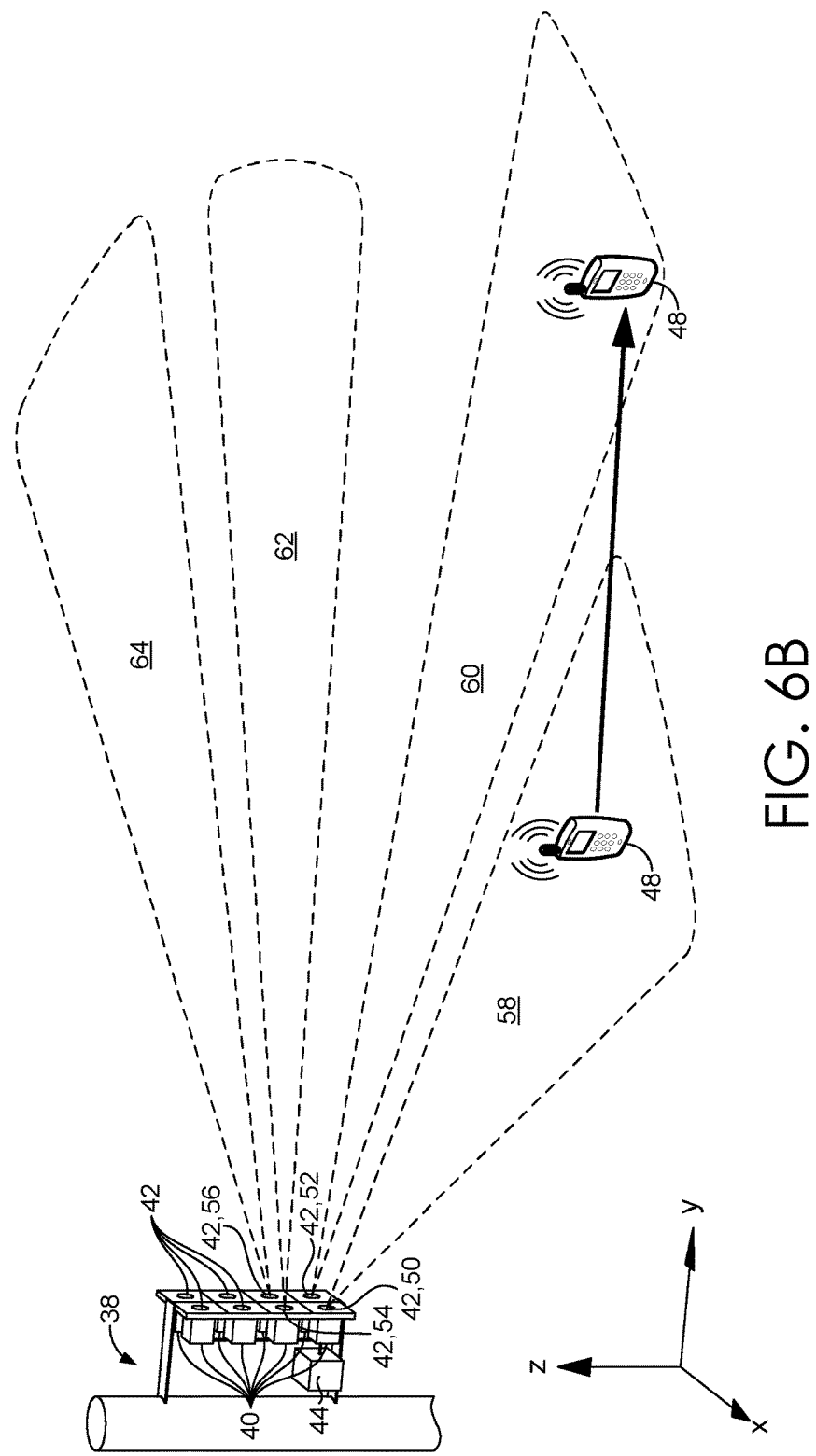

PROVIDING DYNAMIC COVERAGE IN WIRELESS COMMUNICATIONS NETWORKS

TECHNICAL FIELD

The field relates to antennas used for providing coverage in wireless communications networks.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, systems and methods for providing configured and/or dynamically adjustable coverage in wireless communications networks. For example, a broadcast cell in a network may include one or more antennas used to provide one or more sectors of coverage. Each antenna may include at least one radio and at least one corresponding signal transmitting and receiving component in communication with the radio, allowing a signal generated by each radio to be broadcast by the corresponding signal transmitting and receiving component to form at least a portion of a sector of coverage provided by the antenna. Additionally, the signal generated by each radio may be modifiable, allowing a beam of coverage emitted by the corresponding signal transmitting and receiving component to be adjusted (e.g., in any one of an x, y, and/or z-plane) so that the sector of coverage can be configured for a particular operating environment. A signal generated by each radio may also be dynamically modifiable based on a location of a mobile device operating in the wireless communications network. This allows a sector of coverage provided by the antenna to be steered to increase alignment with mobile devices operating in the network, which can improve signal quality, connectivity, throughput, etc., as well as improve resource allocation and network efficiency.

In one embodiment of the technology, a system for providing coverage in a wireless communications network is provided. The system comprises a first antenna comprising a first signal transmitting and receiving component and a first radio communicatively coupled to the first signal transmitting and receiving component. The first radio is configured to generate a first signal and the first signal transmitting and receiving component is configured to broadcast the first signal to form a first portion of a first sector of coverage provided by the first antenna. The first radio is configured to modify the first signal to modify the first portion of the first sector of coverage in at least one of three dimensions.

In another embodiment of the technology, a method for providing dynamic coverage in a wireless communications network is provided. The method comprises generating a first signal using a first radio of a first antenna, communicating the first signal to a first signal transmitting and receiving component of the first antenna, broadcasting the first signal from the first signal transmitting and receiving component to form a first portion of a first sector of coverage provided by the first antenna, accessing a location of a mobile device relative to the first antenna, and dynamically modifying the first signal based on the location of the mobile device to adjust the first portion of the first sector of coverage in any one of three dimensions to increase alignment of the first portion of the first sector of coverage with the mobile device.

In another embodiment of the technology, a method for configuring a broadcast cell to provide dynamic coverage in a wireless communications network is provided. The method comprises coupling a first antenna to the broadcast cell, the first antenna comprising a first signal transmitting and receiving component and a first radio communicatively coupled to the first signal transmitting and receiving component. The first radio is configured to generate a first signal and the first signal transmitting and receiving component is configured to broadcast the first signal to form a first portion of a first sector of coverage provided by the first antenna. The first radio is configured to modify the first signal to modify the first portion of the first sector of coverage in any one of three dimensions. The method further comprises integrating a mobile device tracking component with the broadcast cell, the mobile device tracking component configured to access a location of a mobile device relative to the first antenna, and coupling a base band unit to the broadcast cell. The base band unit is configured to control the modification of the first signal by the first radio based on the location of the mobile device to increase alignment of the first portion of the first sector of coverage with the location of the mobile device.

As used in this disclosure, the term "antenna" includes any one or a combination of components, including software and/or hardware, in localized and/or distributed configurations, that can be collectively utilized to emit/broadcast a sector of coverage that provides communication with mobile devices in a wireless communications network, and is not limited to any one or a combination of components, such as a radio and signal transmitting and receiving component.

BRIEF DESCRIPTION OF THE DRAWINGS

The present technology is described in detail herein with reference to the attached drawing figures, which are intended to be exemplary and non-limiting in nature, wherein:

FIG. 4 depicts an exemplary sector of coverage provided by an antenna in a wireless communications network, in accordance with an embodiment of the present technology;

FIG. 5 depicts an exemplary sector of coverage of an antenna formed from multiple portions broadcasted by separate signal transmitting and receiving components, in accordance with an embodiment of the present technology;

FIG. 6B depicts the antenna of FIG. 6A with one of the portions of the broadcasted sector of coverage modified to facilitate alignment with the mobile device, in accordance with an embodiment of the present technology;

DETAILED DESCRIPTION

Figure 1:
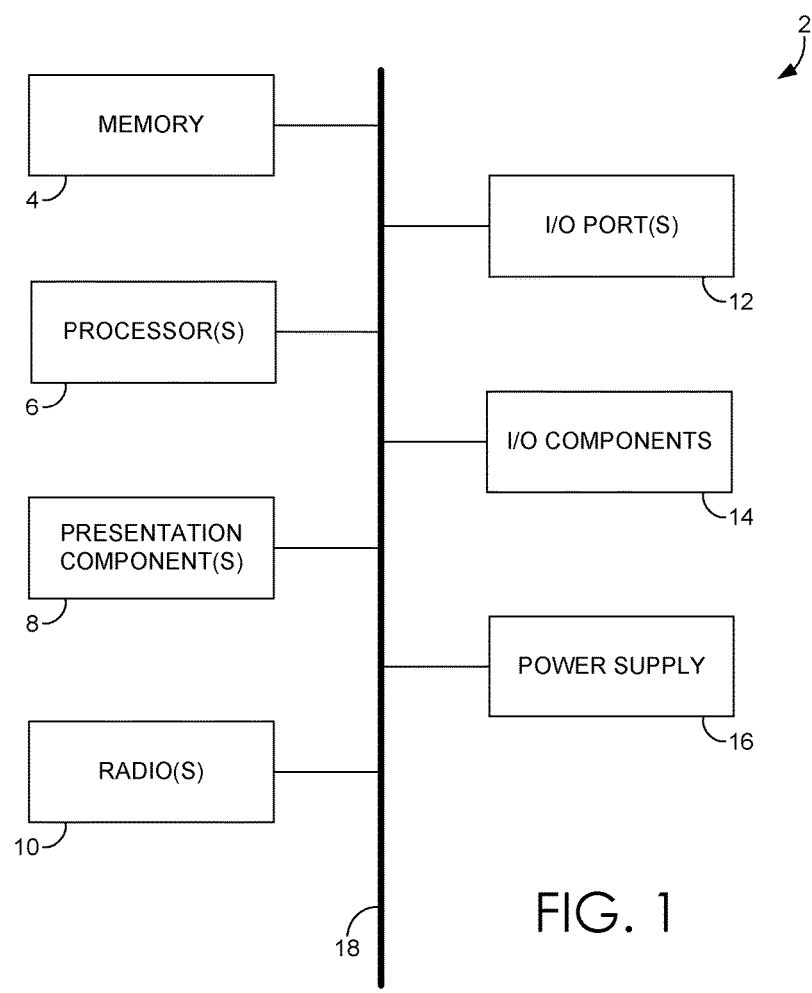
FIG. 1 depicts an exemplary computing device suitable for facilitating the control of coverage in a wireless communications network, in accordance with an embodiment of the present technology.

The subject matter of the present technology is described in this disclosure to meet statutory requirements. However, the description is not intended to limit the scope of the invention. Rather, the claimed subject matter may be embodied in other ways, to include different steps, combinations of steps, features, or combinations of features, similar to the ones described in this disclosure, and in conjunction with other present or future technologies. Moreover, although the terms "step" and/or "block" may be used to identify different elements of methods employed, the terms should not be interpreted as implying any particular order among or between various steps or blocks unless and except when the order of individual steps or blocks is explicitly described and required.

At a high level, this disclosure relates generally to providing coverage in wireless communications networks using antennas adapted to provide sectors of coverage that are configurable and/or dynamically adjustable. Specifically, in one aspect of the technology, a broadcast cell includes at least one antenna with one or more radios that are each connected to one or more corresponding signal transmitting and receiving components that broadcast portions of a sector of coverage from the antenna using signals generated by the radios. The sector of coverage emitted from the antenna is adjustable through modification of the signals generated by the radios, which changes the beams of coverage emitted from the corresponding signal transmitting and receiving components. This modification allows the sector of coverage to be steered to configure coverage for a particular network environment, and/or steered based on locations of mobile devices operating within the network to increase signal connectivity and alignment with the same.

The technology may be embodied as, among other things, a method, a system, and/or a computer-program product. Accordingly, the present technology may take the form of a hardware embodiment, a software embodiment, or an embodiment combining software and hardware, and may also take the form of a computer-program product that includes computer-useable instructions embodied on one or more computer-readable media. The technology may further be implemented as hard-coded into the mechanical design of network components and/or may be built into a broadcast cell, antennas, and/or local or distributed components related to the same.

Computer-readable media may include volatile media, non-volatile media, removable media, and non-removable media, and may also include media readable by a database, a switch, and/or various other network devices. Network switches, routers, and related components are conventional in nature, as are methods of communicating with the same, and thus, further elaboration is not provided herein. By way of example, and not limitation, computer-readable media may comprise computer storage media and/or non-transitory communications media. Communications media does not include signals per se.

Computer storage media, or machine-readable media, may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided herein.

Turning now to FIG. 1, a block diagram of an exemplary computing device 2 suitable for facilitating the configuring of coverage in a wireless communications network is provided, in accordance with an embodiment of the present technology. It should be noted that although some components depicted in FIG. 1 are shown in the singular, they may be plural, and the components may be connected in a different, including distributed, configuration. For example, computing device 2 might include multiple processors and/or multiple radios. As shown in FIG. 1, computing device 2 includes a bus 18 that may directly or indirectly connect different components together, including memory 4, processor(s) 6, presentation component(s) 8 (if applicable), radio(s) 10, input/output (I/O) port(s) 12, input/output (I/O) component(s) 14, and power supply 16.

Memory 4 may take the form of the memory components described herein. Thus, further elaboration will not be provided here, but it should be noted that memory 4 may include any type of tangible medium that is capable of storing information, such as a database. A database may include any collection of records, data, and/or other information. In one aspect, memory 4 may include a set of computer-executable instructions that, when executed, facilitate various functions or steps disclosed herein. These instructions will variously be referred to as "instructions" or an "application" for short. Processor 6 may actually be multiple processors that may receive instructions and process them accordingly. Presentation component 8 may include a display, a speaker, a screen, a portable digital device, and/or other components that can present information through visual, auditory, and/or other tactile cues (e.g., a display, a screen, a lamp, a light-emitting diode (LED), a graphical user interface (GUI), and/or even a lighted keyboard).

Radio 10 may facilitate communication with a network, and may additionally or alternatively facilitate other types of wireless communications, such as Wi-Fi, WiMAX, LTE, Bluetooth, and/or other VoIP communications. In various aspects, the radio 10 may be configured to support multiple technologies, and/or multiple radios may be configured and utilized to support multiple technologies.

Input/output (I/O) ports 12 may take a variety of forms. Exemplary I/O ports may include a USB jack, a stereo jack, an infrared port, and/or other proprietary communications ports. Input/output (I/O) components 14 may comprise one or more keyboards, microphones, speakers, touchscreens, and/or any other item useable to directly or indirectly input data into the computing device 2. Power supply 16 may include batteries, fuel cells, and/or any other component that may act as a power source to supply power to computing device 2 or to other network components.

Figure 2:
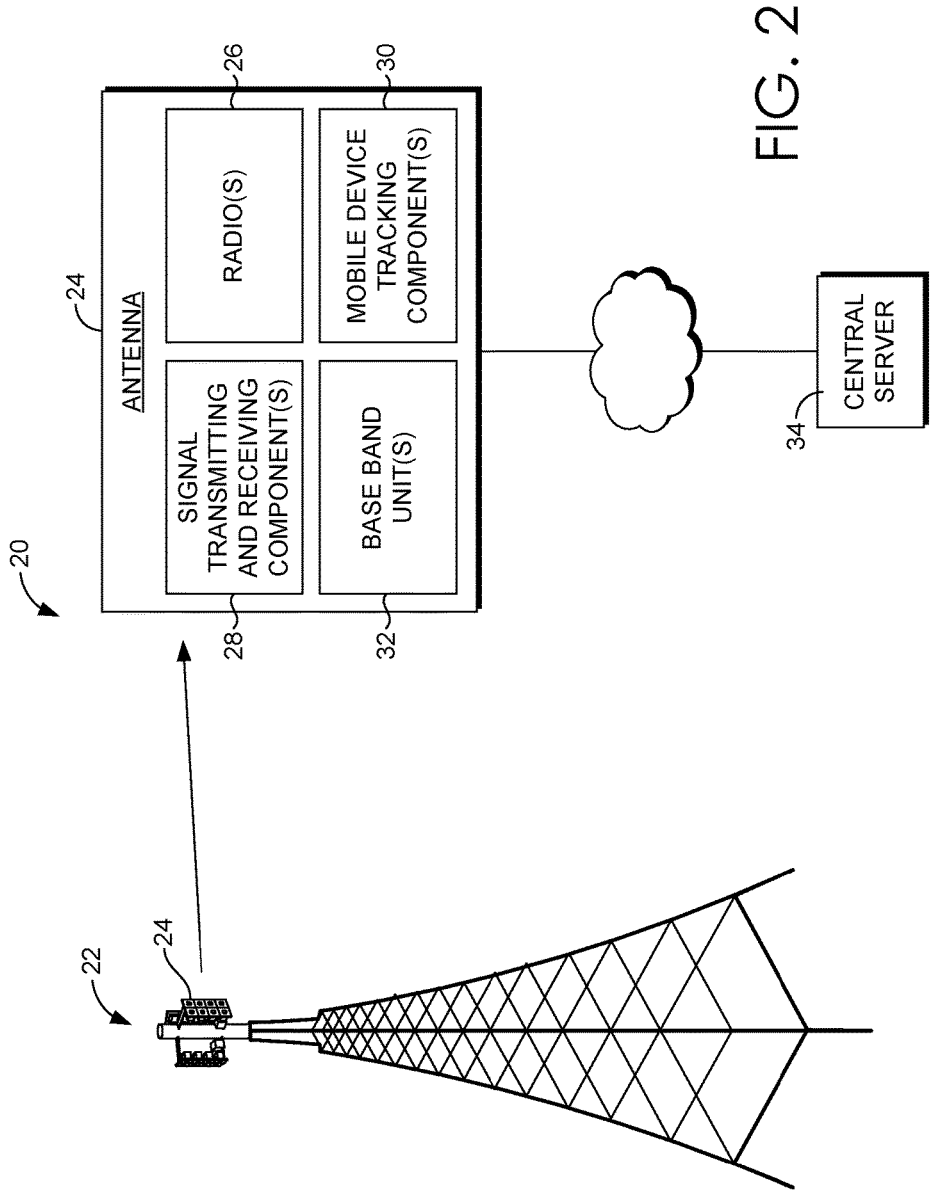
FIG. 2 depicts an exemplary system for controlling coverage in a wireless communications network, in accordance with an embodiment of the present technology.

Referring to FIG. 2, a system 20 adapted to provide configured and/or dynamic coverage in a wireless communications network is provided, in accordance with an embodiment of the present technology. In FIG. 2, the system 20 is depicted in relation to a broadcast cell 22 (e.g., a macro cell, a micro cell, or a mini-macro cell). The system 20 further depicts components of an antenna 24 associated with the broadcast cell 22. The components include signal transmitting and receiving component(s) 28, which may be communicatively coupled to radio(s) 26 and configured to broadcast signals generated by radio(s) 26, mobile device tracking component(s) 30 useable for accessing (e.g., receiving, determining, etc.) a location of one or more mobile devices operating in the wireless communications network, and base band unit(s) 32, which may also be considered control unit(s) that communicate with, monitor, and/or control one or more of the components 26, 28, 30, 32 of the system 20. The base band unit 32 may also be utilized for communication (e.g., wired or wireless) with other network components, such as a central server 34 that is in communication with multiple broadcast cells and/or antennas, or with other broadcast cells in the wireless communications network.

It should be noted that although FIG. 2 depicts the components 26, 28, 30, 32 as being encompassed by the antenna 24, in practice, the components 26, 28, 30, 32, as well as additional or alternative components used with the antenna 24 and the broadcast cell 22, may be local or distributed. For example, the mobile device tracking component 30 may, at least in part, be located at the central server 34 instead of at the broadcast cell 22 or the antenna 24 thereof. Furthermore, any number of the components 26, 28, 30, 32 may be used. For example, the antenna 24 may utilize a plurality of individual radios 26 that are communicatively connected to a plurality of respective signal transmitting and receiving components 28 (e.g., in a one-to-one arrangement). Each of the plurality of signal transmitting and receiving components 28 may broadcast a beam of coverage using a signal generated by the radio 26 coupled thereto. The beams of coverage collectively form the sector of coverage provided by the antenna 24. Additionally, the system 20 enables a greater degree of control over the sector of coverage provided by the antenna 24 by allowing the individual beams of coverage emitted from the signal transmitting and receiving components 28 of the antenna 24 to be adjusted/steered (e.g., in x, y, and/or z-planes) through adjusting the signals generated by the radios 26.

It should be noted that the components depicted in FIG. 2 are exemplary and intended to be non-limiting, and more, fewer, and/or different components may be used in systems for configuring coverage in a wireless communications network. For example, a central server 34 may not be part of the system 20, or the system 20 may further include an activation/deactivation component useable for activating or deactivating portions of the sector of coverage broadcast by the respective signal transmitting and receiving components based on coverage needs.

Figure 3B:
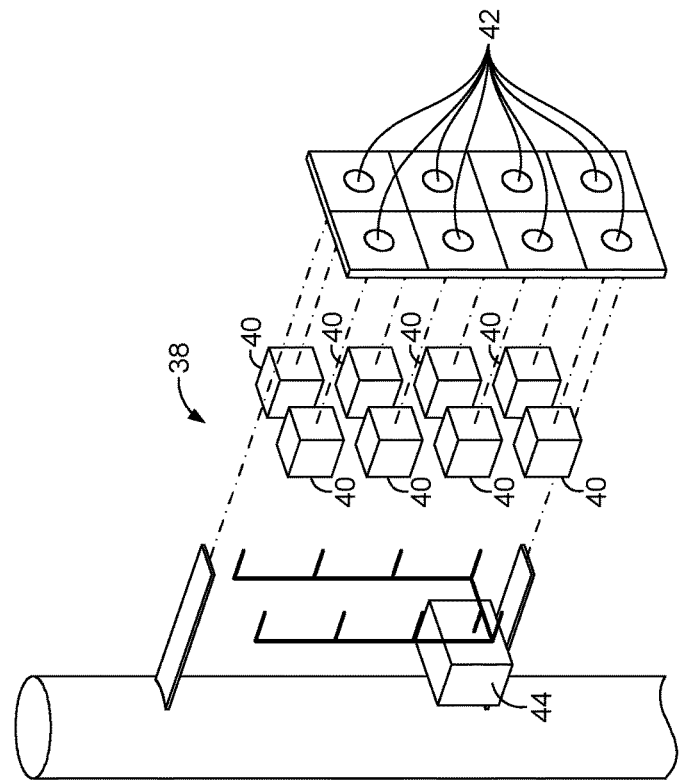
FIG. 3B depicts an exploded view of one antenna of the antenna array depicted in FIG. 3A, in accordance with an embodiment of the present technology.
Figure 3A:
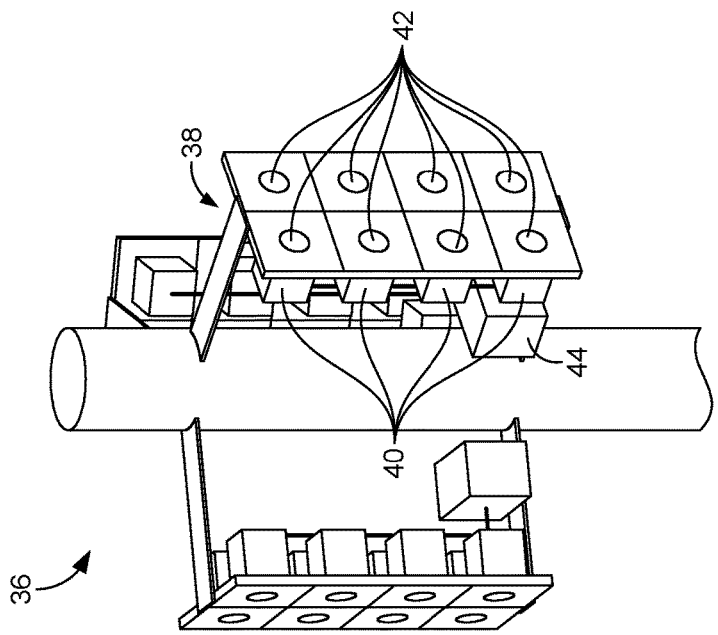
FIG. 3A depicts an exemplary antenna array configured to provide dynamic coverage in a wireless communications network, in accordance with an embodiment of the present technology.

Referring to FIG. 3A, an antenna array 36 configured to provide one or more adjustable sectors of coverage is provided, in accordance with an embodiment of the present technology. The antenna array 36 includes an antenna 38 having a plurality of radios 40 that are communicatively coupled to a plurality of corresponding signal transmitting and receiving components 42. It should be noted that a number of the radios 40 are obscured in FIG. 3A, but are depicted in the exploded view of the antenna 38 in FIG. 3B. Each radio 40 is coupled to a corresponding signal transmitting and receiving component 42 to generate and send a signal to the same. The antenna 38 further includes a base band unit 44 that is communicatively coupled to each of the radios 40. The base band unit 44 may include, enclose, and/or otherwise connect components associated with the control of the radios 40 (e.g., the signals thereof) and/or the signal transmitting and receiving components 42. The base band unit 44 may include computer processors and computer-readable media useable to execute processes that affect the broadcasted coverage provided by the antenna 38. The antenna 38 may also include additional components that are not depicted in FIGS. 3A-3B, such as a power supply, inter-broadcast cell communications equipment, mobile device tracking components (e.g., which may be integrated into the base band unit 44), and/or other components.

Referring to FIG. 3B, the antenna 38 of FIG. 3A is depicted in exploded form showing the configuration of the components 40, 42, 44, in accordance with an embodiment of the present technology. FIG. 3B shows how each of the radios 40 is coupled to a respective one of the signal transmitting and receiving components 42, allowing the signal generated by each of the radios 40 to be modified for the corresponding signal transmitting and receiving component 42. As a result, each signal transmitting and receiving component 42 is able to broadcast an individually configured portion (i.e., beam) of the sector of coverage provided by the antenna 38. The signal of each radio 40 may be adjustable, allowing the beam of coverage emitted from the corresponding signal transmitting and receiving component 42 to be modified in any one of three dimensions (i.e., in the x, y, and/or z-planes). This allows a sector of coverage to be provided that is configured for a particular network environment (e.g., geography or mobile device density) or that is dynamically modifiable based on determined locations of mobile devices operating in the wireless communications network.

For example, to modify and/or control the sector of coverage in three dimensions, a signal generated by the radio 40 may be modified, such as by modifying a power, a phase, an amplitude, and/or a frequency of the signal, which changes how the beam is radiated from the corresponding signal transmitting and receiving component 42 (i.e., adjusting it in at least one of the x, y, and z-plane). This modification may be initiated to target the beam in a specific direction or to adjust it based on a dynamic location of a mobile device connecting to the network through the antenna 38.

Referring to FIG. 4, an exemplary sector of coverage 46 broadcast in a wireless communications network is provided, in accordance with an embodiment of the present technology. More specifically, FIG. 4 depicts the antenna array 36 of FIGS. 3A-3B with the antenna 38 broadcasting the sector of coverage 46 to an area in which several mobile devices 48 are operating. The sector of coverage 46 spans horizontally and vertically from the antenna 38. The mobile devices 48 are positioned at locations where the sector of coverage 46 extends. However, the positioning of the mobile devices may have an effect on the connection between the mobile devices 48 and the antenna 38. Accordingly, modifying the sector of coverage on a more segmented level may allow for improved connection with the mobile devices 48

(e.g., signal quality, throughput, uplink, location tracking, etc.), as well as a more efficient use of network resources.

Referring to FIG. 5, the antenna array 36 of FIGS. 3A-3B is depicted with the antenna 38 broadcasting a sector of coverage to mobile devices 48 operating in the wireless communications network, in accordance with an embodiment of the present technology. In FIG. 5, the antenna 38 is once again shown with the radios 40 connected to the respective signal transmitting and receiving components 42. In operation, each radio 40 generates a signal that is communicated to the corresponding signal transmitting and receiving component 42, where it is broadcast over a portion of the sector of coverage provided by the antenna 38. For the purposes of clarity and explanation, FIG. 5 depicts only first, second, third, and fourth signal transmitting and receiving components 50, 52, 54, 56 broadcasting respective first, second, third, and fourth portions 58, 60, 62, 64 of the sector of coverage using signals generated from the respective connected radios 40. In this sense, the first, second, third, and fourth portions 58, 60, 62, 64 collectively form at least a portion of the sector of coverage broadcast from the antenna 38.

In operation, the emitted beams from each of the first, second, third, and fourth signal transmitting and receiving components 50, 52, 54, 56 that form the respective first, second, third, and fourth portions 58, 60, 62, 64 of the sector of coverage are modifiable in any of three dimensions (i.e., the x, y, and z-plane) to change the orientation and/or footprint of the respective portions 58, 60, 62, 64 of the sector of coverage as needed. This adjustment can be used to provide a configured sector of coverage that is suitable for a certain network environment (e.g., based on geography, density of population, signal interference factors, etc.), or to provide dynamically shifting portions 58, 60, 62, 64 of the sector of coverage that can be adjusted to more directly align with the mobile devices 48 located in the network (e.g., by increasing alignment of one of the portions 58, 60, 62, 64 of the sector of coverage with a specific mobile device 48). The adjustment of the first, second, third, and fourth portions 58, 60, 62, 64 of the sector of coverage may be controlled through adjustment of the signals generated by the radios associated with each of the first, second, third, and fourth signal transmitting and receiving components 50, 52, 54, 56. For example, signal characteristics may be adjusted based on instruction from the base band unit 44 to dynamically shift coverage provided by the first, second, third, and fourth signal transmitting and receiving components 50, 52, 54, 56 of the sector of coverage based on network needs (e.g., mobile device position, concentration, movement, etc.).

Figure 6A:
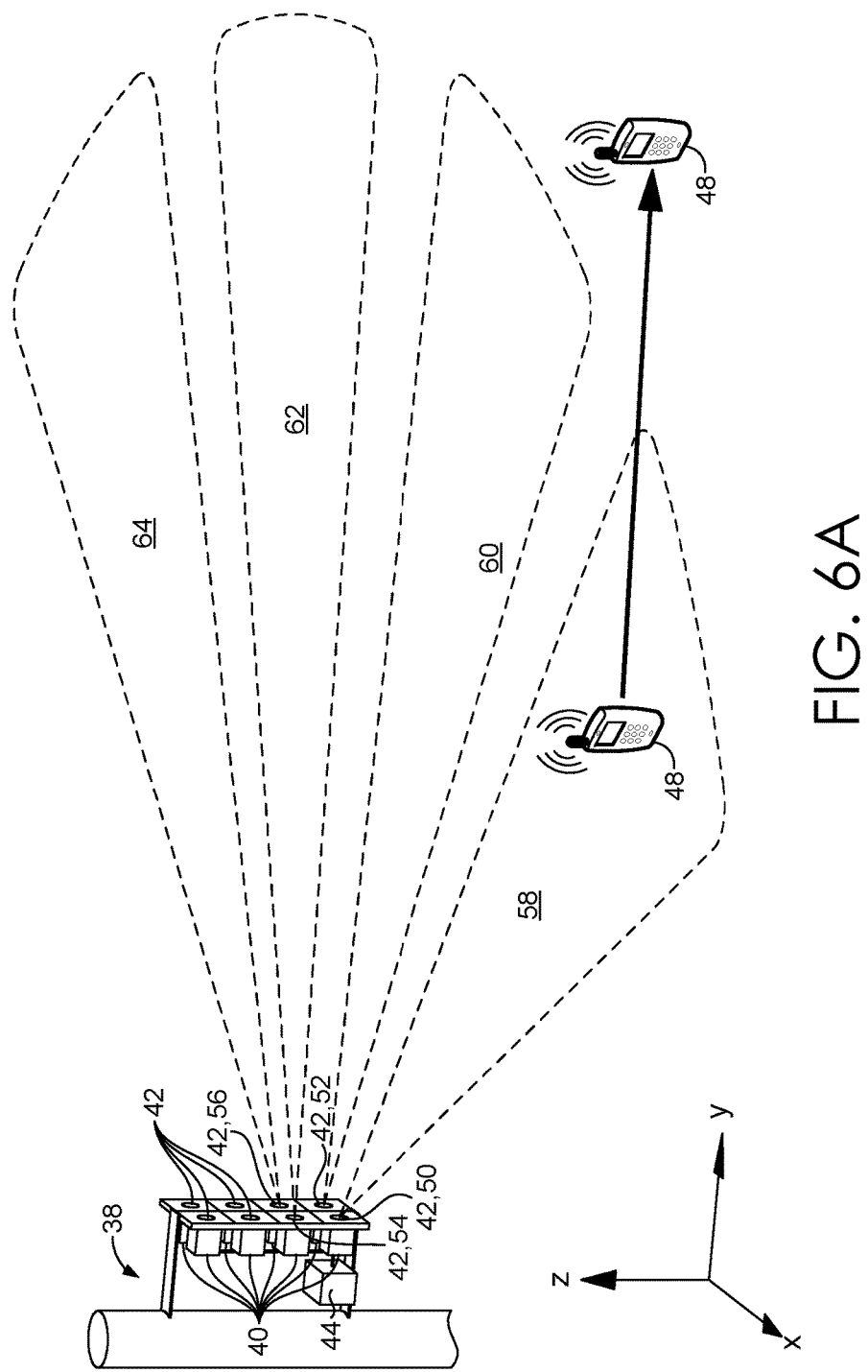
FIG. 6A depicts the antenna of FIG. 5 with a mobile device changing location relative to the antenna, in accordance with an embodiment of the present technology.

Referring to FIGS. 6A and 6B, the antenna 38 of FIG. 5 is again shown with the first, second, third, and fourth signal transmitting and receiving components 50, 52, 54, 56 broadcasting the respective first, second, third, and fourth portions 58, 60, 62, 64 of the sector of coverage. Additionally, a mobile device 48 is shown moving from a position within the first portion 58 of the sector of coverage to a location away from the first portion 58 of the sector of coverage.

In FIG. 6B, a signal generated and sent from one of the radios 40 to the second signal transmitting and receiving component 52 is modified (e.g., adjusted in phase, amplitude, frequency, power, etc.) so that the second portion 60 of the sector of coverage is adjusted. For example, in FIG. 6B, the adjustment is generally in the y-plane, but may also be in the x-plane (i.e., horizontally) or in the z-plane (i.e., vertically). This modification may be controlled and/or initiated at the radio 40, by the base band unit 44, by a mobile device tracking component integrated with the antenna 38, by a central server, or through some combination of the same, or using different control components.

Figure 7:
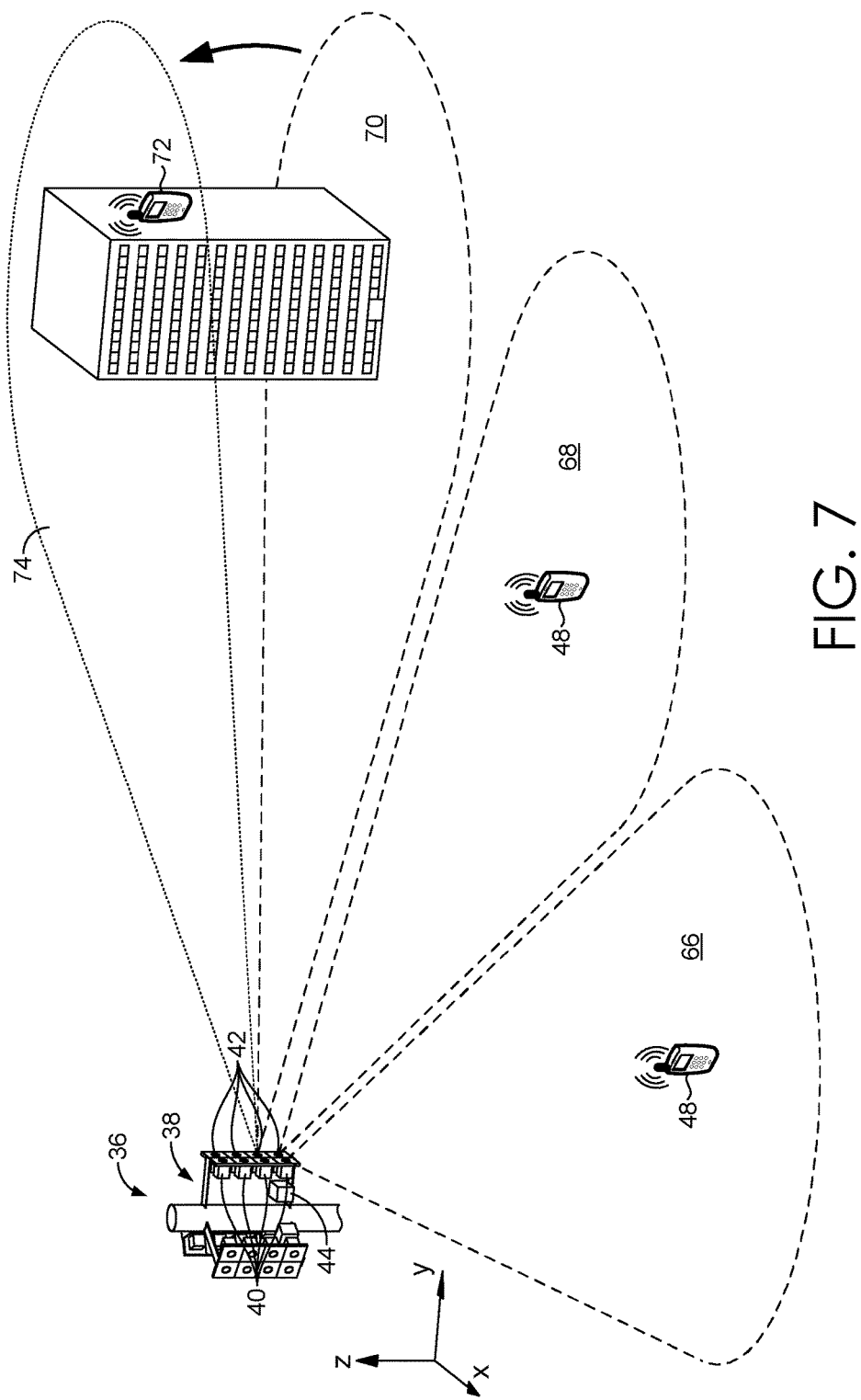
FIG. 7 depicts the antenna array of FIG. 3A with one antenna broadcasting a sector of coverage that is configured for a particular network environment, in accordance with an embodiment of the present technology.

Referring to FIG. 7, the antenna 38 of FIGS. 3A-3B is depicted broadcasting a sector of coverage adapted for a particular network environment, in accordance with an embodiment of the present technology. In FIG. 7, several signal transmitting and receiving components 42 of the antenna 38 are broadcasting signals generated by respective radios 40 of the antenna 38, forming individual portions 66, 68, 70 of the sector of coverage. Furthermore, using signal modification, the x, y, and/or z-plane alignment of the broadcasted portions 66, 68, 70 of the sector of coverage are steered/focused based on the location of mobile devices 48 relative to the antenna 38, and/or based on other network factors (e.g., geography, mobile device density, etc.).

The locations of the mobile devices 48, 72 shown in FIG. 7 may be accessed (e.g., determined, retrieved, calculated, etc.) based on global positioning system (GPS) coordinates received from the mobile devices 48, 72, based on multilateration of signals between broadcast cells (e.g., triangulation of mobile device signals), or through other communication or contact between the antenna 38 and the mobile devices 48, 72 (e.g., an established uplink). Additionally, in FIG. 7, one mobile device 72 is shown at a higher z elevation, for which a particular portion 74 of the sector of coverage is adjusted (e.g., using signal modification) to provide greater alignment of the portion 74 of the sector of coverage with the mobile device 72. The increased alignment may be determined based on a percentage of alignment with the determined location, or based on the quality of a signal established with the mobile device 72 (e.g., a signal strength, a signal throughput, a signal-to-noise ratio, etc.). In this sense, when a mobile device 72 travels to any area where a higher density, elevation, or other factor limits connectivity with the network, the antenna 38, having determined the location of the mobile device 72, can adjust the coverage accordingly for better network performance.

Figure 8:
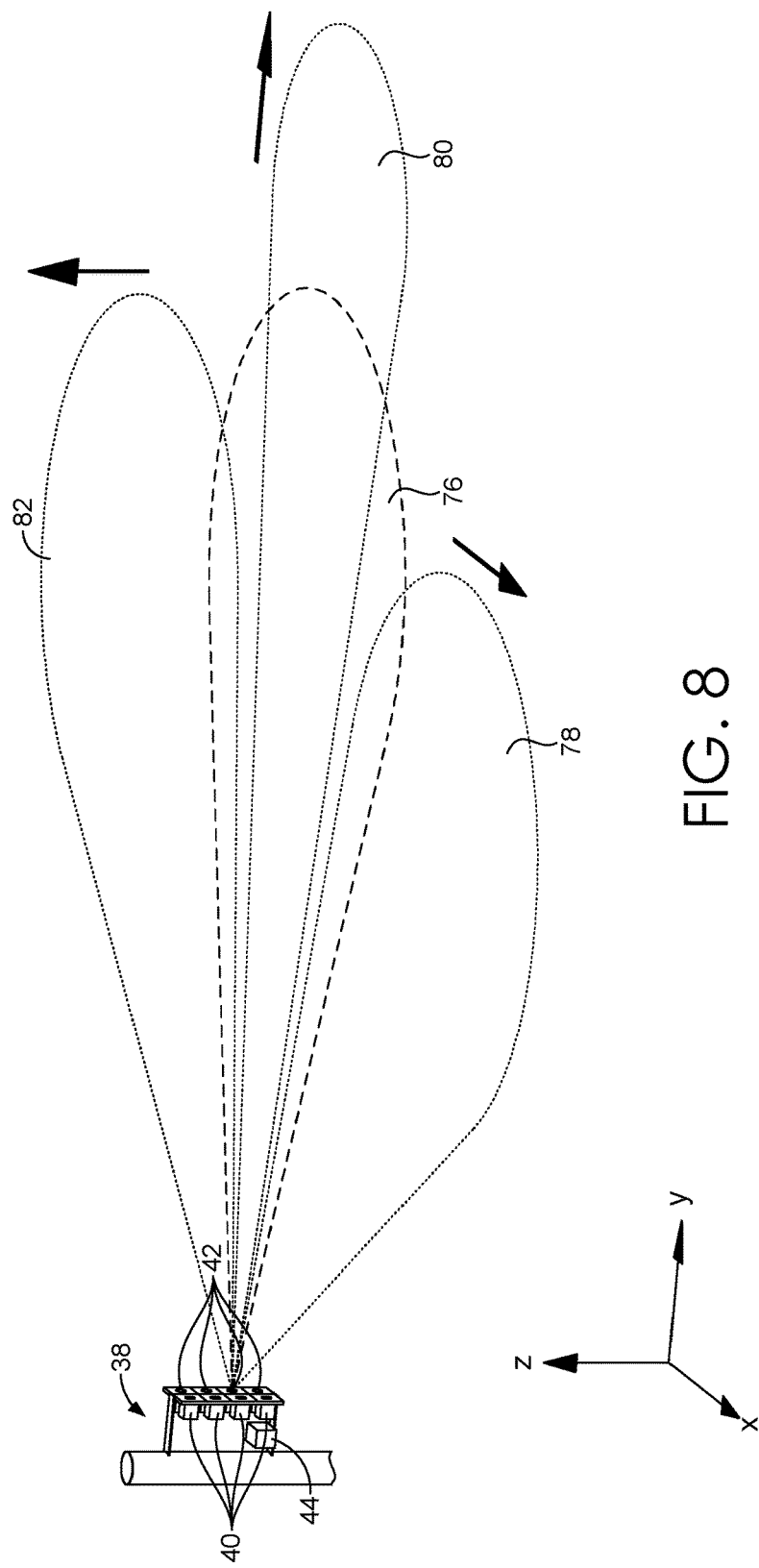
FIG. 8 depicts the antenna of FIG. 3B showing how modification of a signal allows the sector of coverage to be steered in three dimensions, in accordance with an embodiment of the present technology.

Referring to FIG. 8, the antenna 38 of FIGS. 3A-3B is depicted broadcasting a portion 76 of a sector of coverage which is subsequently modified based on different signal adjustments, in accordance with an embodiment of the present technology. In FIG. 8, a first signal adjustment is used to modify the portion 76 of the sector of coverage in an x-plane to form a first modified coverage footprint 78, a second signal adjustment is used to modify the portion 76 of the sector of coverage in a y-plane to form a second modified coverage footprint 80, and a third signal adjustment is used to modify the portion 76 of the sector of coverage in a z-plane to form a third modified coverage footprint 82. Any one or a combination of such adjustments may be used to adjust coverage. As discussed in the preceding sections, the adjustment may include changes to the power, phase, amplitude, frequency, etc., of the signal generated by the radio, and may be directed by a distributed or integrated base band unit, such as the base band unit 44.

Figure 9:
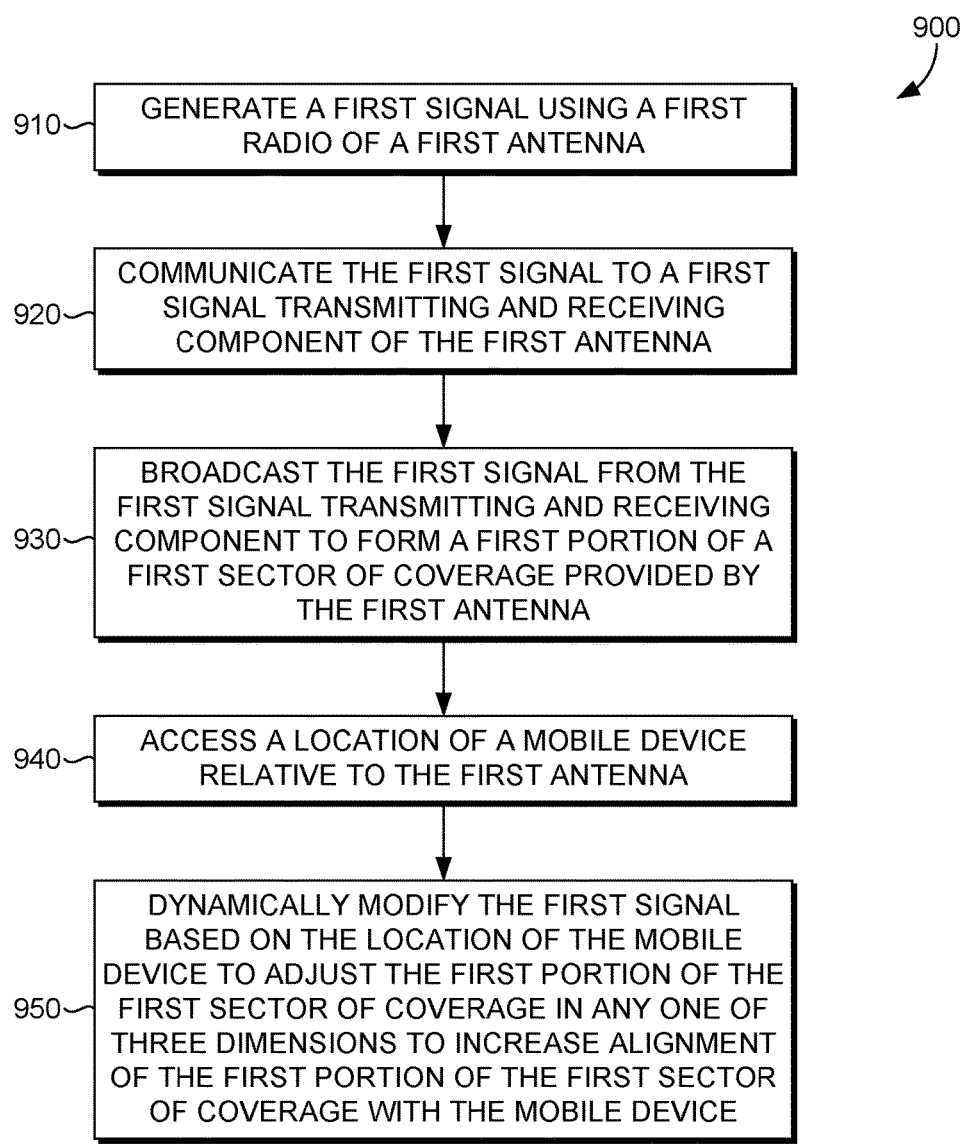
FIG. 9 is a block diagram of an exemplary method for providing coverage in a wireless communications network, in accordance with an embodiment of the present technology.

Referring to FIG. 9, a block diagram of an exemplary method 900 for providing coverage in a wireless communications network is provided, in accordance with an embodiment of the present technology. At block 910, a first signal is generated using a first radio, such as the radio 40 of FIG. 3A, of a first antenna, such as the antenna 38 of FIG. 3A. At block 920, the first signal is communicated to a first signal transmitting and receiving component, such as the first signal transmitting and receiving component 50 of FIG. 5, of the first antenna. At block 930, the first signal is broadcasted from the first signal transmitting and receiving component to form a first portion of a first sector of coverage, such as the first portion 58 shown in FIG. 5, provided by the first antenna. At block 940, a location of a mobile device, such as the mobile device 72 shown in FIG. 7, relative to the first antenna is accessed. At block 950, the first signal is dynamically modified based on the location of the mobile device to adjust the first portion of the first sector of coverage in any one of three dimensions to increase alignment of the first portion of the first sector of coverage with the mobile device.

Figure 10:
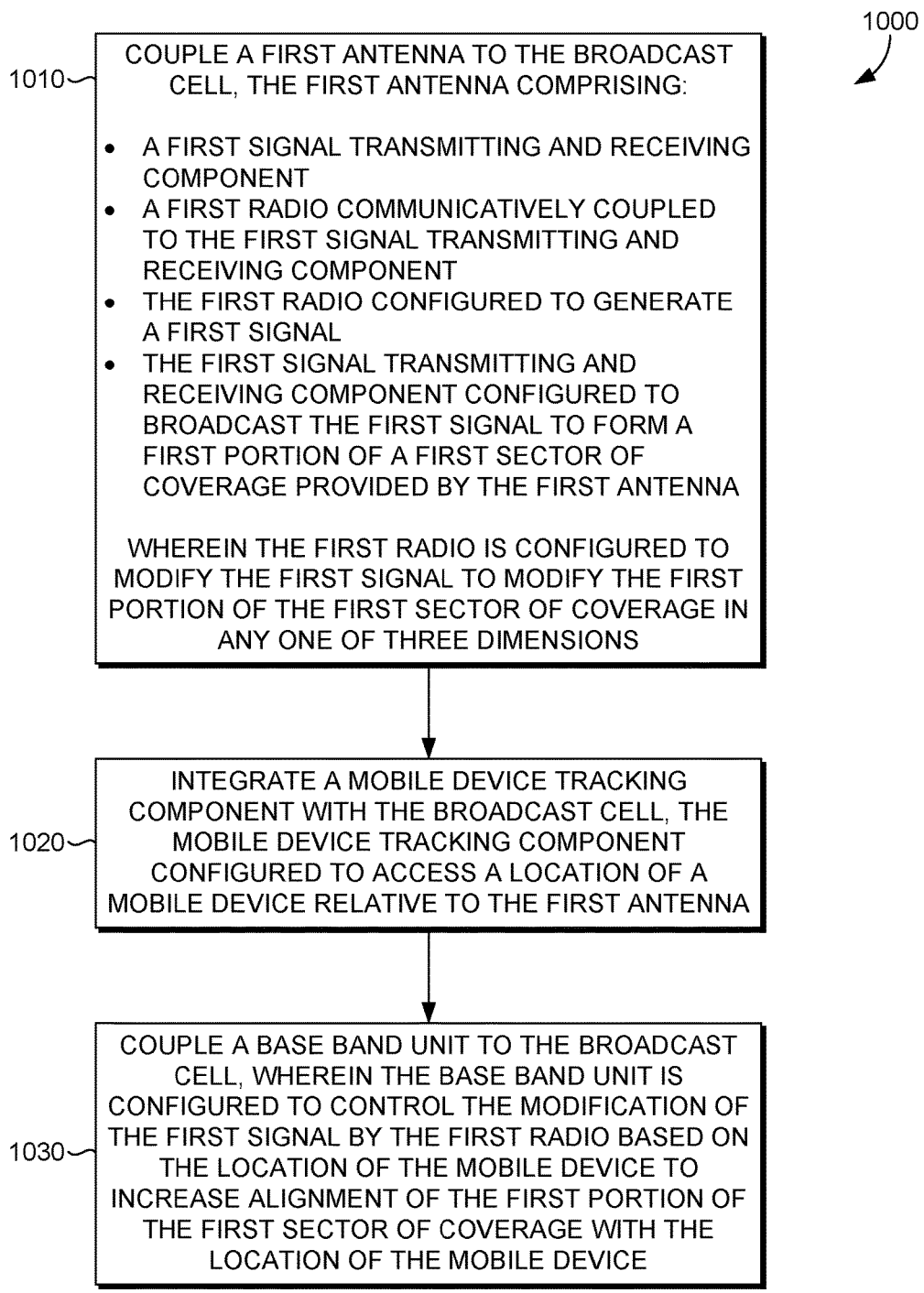
FIG. 10 is a block diagram of an exemplary method for configuring a broadcast cell to provide dynamic coverage in a wireless communications network, in accordance with an embodiment of the present technology.

Referring to FIG. 10, a block diagram of an exemplary method 1000 for configuring a broadcast cell to provide dynamic coverage in a wireless communications network is provided, in accordance with an embodiment of the present technology. At block 1010, a first antenna, such as the antenna 38 shown in FIG. 3A, is coupled to a first broadcast cell, such as the broadcast cell 22 shown in FIG. 2. The first antenna comprises a first signal transmitting and receiving component, such as the first signal transmitting and receiving component 50 shown in FIG. 5, and a first radio, such as the radio 40 shown in FIG. 5, communicatively coupled to the first signal transmitting and receiving component. The first radio is configured to generate a first signal, and the first signal transmitting and receiving component is configured to broadcast the first signal to form a first portion of a first sector of coverage, such as the first portion 58 shown in FIG. 5, provided by the first antenna. At block 1020, a mobile device tracking component, such as the mobile device tracking component 30 shown in FIG. 2, is integrated with the broadcast cell. The mobile device tracking component is configured to access a location of a mobile device, such as the mobile device 48 shown in FIG. 5, relative to the first antenna. At block 1030, a base band unit, such as the base band unit 44 shown in FIG. 3A, is coupled to the broadcast cell. The base band unit is configured to control the modification of the first signal by the first radio based on the location of the mobile device to increase alignment of the first portion of the first sector of coverage with the location of the mobile device.

The present technology has been described in relation to particular embodiments, which are intended in all respects to be illustrative rather than restrictive. Alternative embodiments will become apparent to those of ordinary skill in the art to which the present technology pertains without departing from its scope. Different combinations of elements, as well as use of elements not shown, are possible and contemplated.

What is claimed is:

1. A system for providing dynamic coverage in a wireless communications network, the system comprising:
   a mobile device tracking component located at least partially at a central server that is in communication with a plurality of broadcast cells operating in the wireless communications network; and
   a first broadcast cell of the plurality of broadcast cells, the first broadcast cell comprising a first antenna, the first antenna comprising:
      a first signal transmitting and receiving component, and
      a first radio communicatively coupled to the first signal transmitting and receiving component,
      the first radio configured to generate a first signal, and
      the first signal transmitting and receiving component configured to broadcast the first signal to form a first portion of a first sector of coverage provided by the first antenna,
      wherein the first radio is configured to modify the first signal based on an instruction from the mobile device tracking component, which dynamically determines a location of a mobile device relative to the first broadcast cell, to modify the first portion of the first sector of coverage in any one of three dimensions in order to increase alignment of the first portion of the first sector of coverage with the location of the mobile device dynamically determined by the mobile device tracking component.

2. The system of claim 1, wherein the first antenna further comprises:
   a second signal transmitting and receiving component; and
   a second radio communicatively coupled to the second signal transmitting and receiving component,
   the second radio configured to generate a second signal,
   the second signal transmitting and receiving component configured to broadcast the second signal to form a second portion of the first sector of coverage provided by the first antenna,
   wherein the second radio is configured to modify the second signal based on an instruction from the mobile device tracking component to modify the second portion of the first sector of coverage in any one of three dimensions in order to increase alignment of the second portion of the first sector of coverage with the location of the mobile device dynamically determined by the mobile device tracking component.

3. The system of claim 2, further comprising a base band unit communicatively coupled to the first radio and the second radio, wherein the base band unit is configured to control modification of the first signal and modification of the second signal to control a mapping of the first and second portions of the first sector of coverage.

4. The system of claim 3, further comprising a cell tower, wherein the first antenna is coupled to the cell tower, and wherein the base band unit is integrated with the cell tower at a location separate from the first antenna.

5. The system of claim 1, wherein modifying the first signal comprises modifying a power of the first signal.

6. The system of claim 1, wherein modifying the first signal comprises changing a frequency of the first signal.

7. The system of claim 1, wherein the mobile device tracking component is configured to determine the location of the mobile device based on a multi-lateration of signals between at least some of the plurality of broadcast cells and the mobile device.

8. The system of claim 1, wherein the mobile device tracking component communicates the instruction to modify the first signal from the central server to a base band unit located at the first broadcast cell, wherein the base band unit is configured to control operation of the first radio.

9. A method for providing dynamic coverage in a wireless communications network, the method comprising:
   determining, using a mobile device tracking component located at least partially at a central server that is in communication with a plurality of broadcast cells operating in the wireless communications network, a location of a mobile device relative to a first broadcast cell of the plurality of broadcast cells;
   generating a first signal using a first radio located at the first broadcast cell;
   communicating the first signal to a first signal transmitting and receiving component of a first antenna located at the first broadcast cell;
   broadcasting the first signal from the first signal transmitting and receiving component to form a first portion of a first sector of coverage provided by the first antenna;

determining, by the mobile device tracking component, a new location of the mobile device relative to the first broadcast cell; and instructing, by the mobile device tracking component, the first radio to modify the first signal based on the new location of the mobile device to adjust the first portion of the first sector of coverage in any one of three dimensions to increase alignment of the first portion of the first sector of coverage with the new location of the mobile device.

10. The method of claim 9, further comprising:

generating a second signal using a second radio located at the first broadcast cell;

communicating the second signal to a second signal transmitting and receiving component of the first antenna;

broadcasting the second signal from the second signal transmitting and receiving component to form a second portion of the first sector of coverage provided by the first antenna; and instructing, by the mobile device tracking component, the second radio to modify the second signal based on the new location of the mobile device to adjust the second portion of the first sector of coverage in any one of three dimensions to increase alignment of the second portion of the first sector of coverage with the new location of the mobile device.

11. The method of claim 10, further comprising, upon modifying the second signal based on the new location of the mobile device to adjust the second portion of the first sector of coverage, instructing, by the mobile device tracking component, the first radio to modify the first signal to adjust the first portion of the first sector of coverage to decrease alignment of the first portion of the first sector of coverage with the new location of the mobile device.

12. The method of claim 10, wherein modifying the first and second signals comprises modifying at least one of a power, a phase, an amplitude, and a frequency of the first and second signals.

13. The method of claim 9, wherein the new location of the mobile device is determined based on at least one of:

a multi-lateration of signals between at least some of the plurality of broadcast cells and the mobile device; and an uplink established between the mobile device and the first broadcast cell.

* * * * *